June 7, 1927.
A. W. HAPPEL
1,631,125
RECIPROCATING FEEDER
Filed Dec. 17, 1923
3 Sheets-Sheet 3
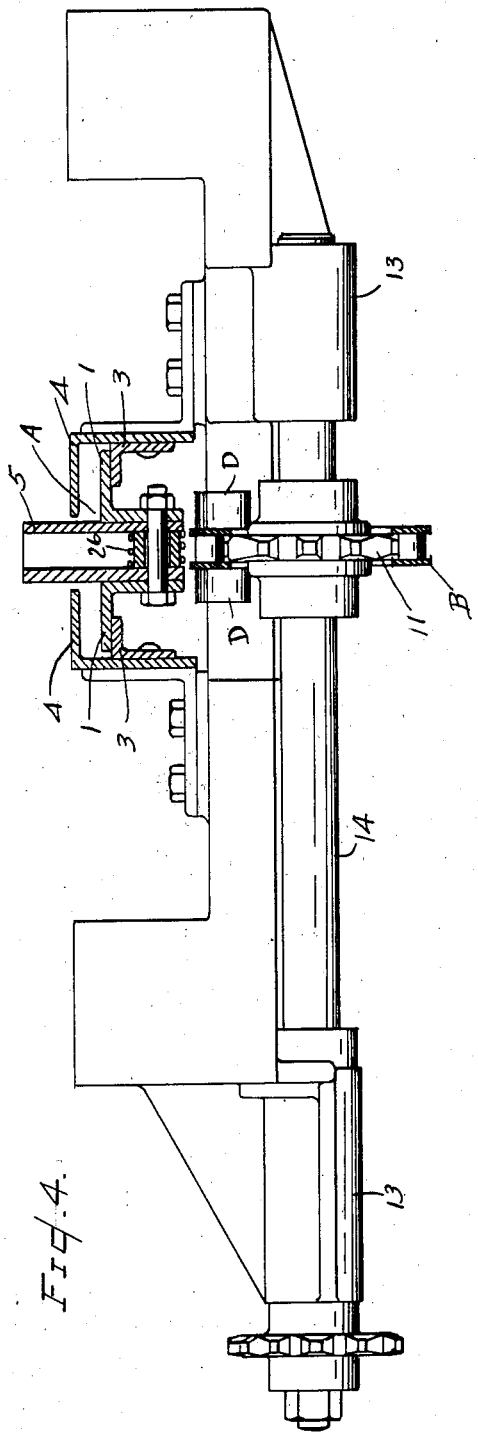
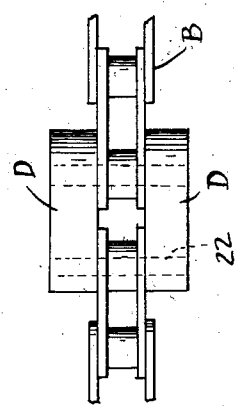
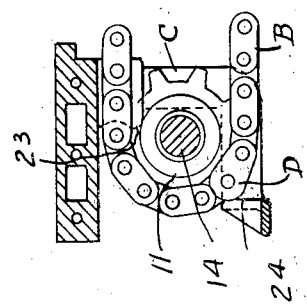
Inventor
Albert W Happel
By Whittemore, Hulbert, Whittemore, + Belknap
Attorneys Patented June 7, 1927.

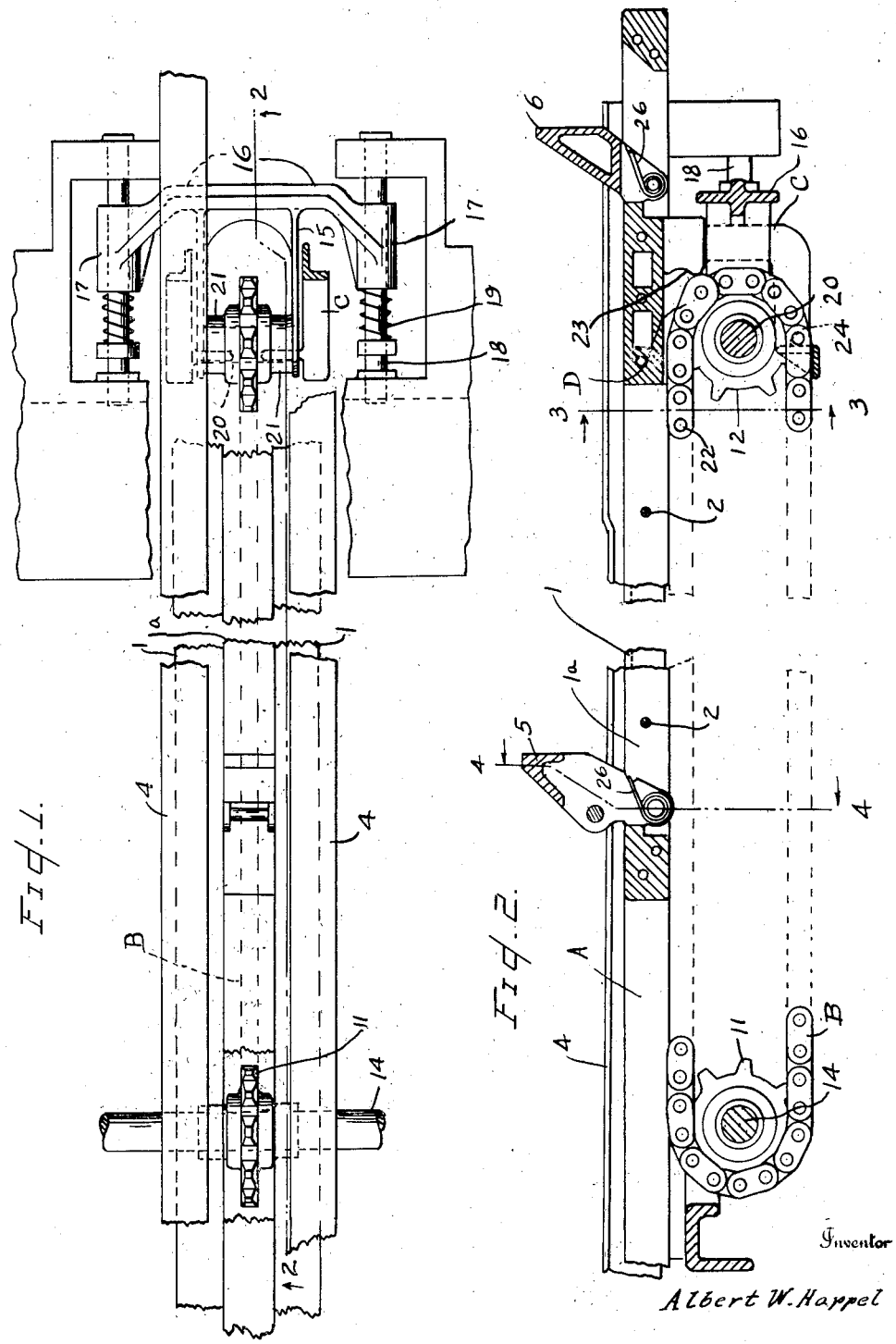

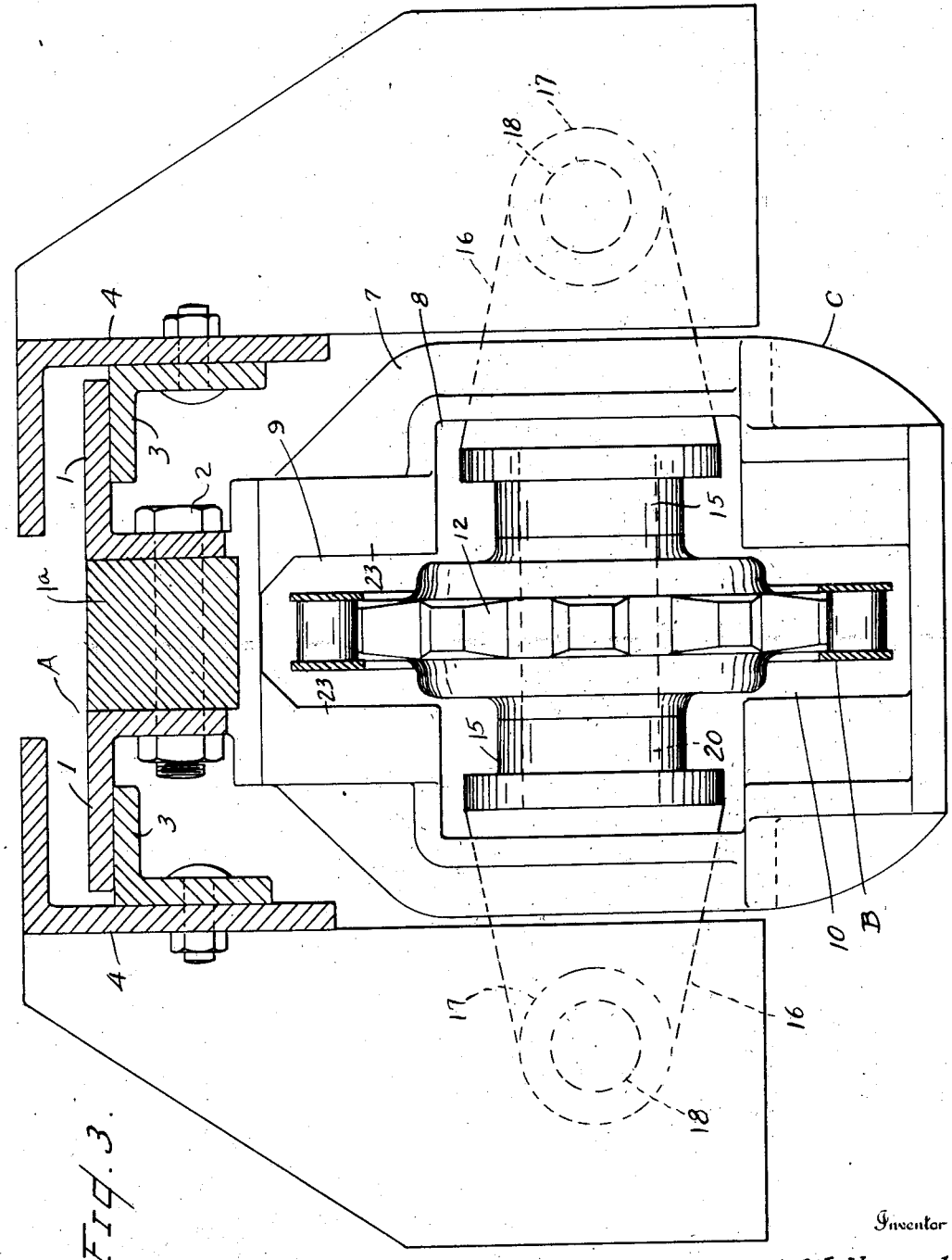

1,631,125

UNITED STATES PATENT OFFICE.

ALBERT W. HAPPEL, OF TOLEDO, OHIO, ASSIGNOR, BY MESNE ASSIGNMENTS, TO THE ULINE ICE-SCORING MACHINE COMPANY, OF WILMINGTON, DELAWARE, A CORPORATION OF DELAWARE.

RECIPROCATING FEEDER.

Application filed December 17, 1923. Serial No. 681,258.

This invention relates to reciprocating feeders and has an especial application to use in artificial ice plants for periodically feeding blocks of ice to machines for scoring the same.

It is the object of the invention to provide a means for reciprocating a feeder by means of a continuously driven endless chain or the like.

A feature of the invention is the provision upon opposite sides of the chain of members imparting a reciprocatory motion to the feeder.

In the drawings:—

Figure 1 is a plan view of the improved feed mechanism;

Figure 2 is a longitudinal sectional elevation of the same on line 2—2 of Figure 1;

Figure 3 is a vertical section on line 3—3 of Figure 2;

Figure 4 is a vertical section taken on line 4—4 of Figure 2;

Figure 5 is a vertical sectional view showing the drive arm carried by the reciprocatory feeder in its opposite limiting position to that shown in Figure 2;

Figure 6 is a plan view of a portion of the drive chain, showing drive elements carried upon opposite sides of said chain.

Broadly the invention comprises a reciprocatory feed member A, an endless flexible actuating member B for said feed member, this actuating member in the disclosed embodiment of the invention being a chain, an arm C projecting from the reciprocatory member for engagement by the chain, and elements D carried by the chain and engageable with said arm to drive the latter.

Considering these primary parts more in detail, 1 designates a pair of angle bars separated by a spacer bar 1ª and clamped upon said spacer bar in a parallel relation by bolts 2. Said angle bars have oppositely projecting flanges which slidably seat upon a pair of stationary angle bars 3 secured to the spaced parallel bars 4 of a frame which is not disclosed in its entirety. 5 and 6 designate upstanding projections carried by the reciprocatory member A at suitable intervals, said members being supported between the angle bars 1. Said projections are adapted to engage ice blocks or other objects to be successively advanced by the invention. The member A is provided with a depending arm 7 of an angular form, said arm having a large central aperture 8 and being formed with smaller openings 9 and 10 extended respectively upwardly and downwardly from the aperture 8.

For actuating the feeder A the endless chain B is mounted below said feeder upon a pair of sprocket wheels 11 and 12 spaced apart a distance approximately equal to the stroke of the member A. 11 is the driving sprocket wheel and may be actuated by any suitable means not shown. 13 are suitable fixed bearings for the shaft 14 of the sprocket wheel 11. The sprocket wheel 12 is mounted in a bearing member 15 which is adapted under stress to undergo a limited yielding movement toward the driven sprocket. Thus the member 15 has arms 16 projecting oppositely laterally and terminally formed with integral bearings 17 slidably mounted upon rods 18 upon which rods are also mounted coil springs 19 urging the bearing 15 in a direction to tension the chain B. The sprocket wheel 12 is mounted upon a stud shaft 20 between the bearing members 21 journaling said shaft. As the feeder member A approaches the limiting position of its reciprocation toward the bearing 15, the unit formed by the latter with the stud shaft 20 and sprocket wheel 12 is adapted to project into the large central aperture 8 of the arm 7, thus permitting said arm to assume the position shown in Figure 2. The upper and lower extensions 9 and 10 of the aperture 8 accommodate the upper and lower spans of the chain B when said arm 7 is in or adjacent the position shown in Figure 2. The members D have the nature of thick plates oppositely mounted upon the chain B, being secured to the latter by two of the pins 22 of said chain which are laterally extended beyond the remaining pins of said chain. For actuating the feeder A toward the yieldable bearing 15 the elements D engage shoulders 23 formed upon the arm 7 at each side of its opening 9. As shown in Figure 2 the reciprocatory member C has reached a limiting position and the drive elements D are just about to disengage the shoulders 23. At its free end the arm 7 is formed at opposite sides of the opening 10 with shoulders 24 which are engageable by the drive elements D to actuate said arm and the feeder A toward the fixed bearing 13.

It is a feature of the invention that the drive stress acting in the chain from its engagement with the arm 7 is balanced upon opposite sides of the chain by securing the drive elements D oppositely upon the chain and by forming the arm 7 with shoulders at opposite sides of the chain for engagement by said elements. The feasibility of such an arrangement results largely from the specific construction of the bearing 15 and of the arm 7 whereby said arm may assume the position shown in Figure 2 partly embracing said bearing and adapting the drive elements D to first clear the shoulders 23 and subsequently oppositely engage the shoulders 24. To secure such result it is necessary that the shoulders 23 and 24 assume an opposite position relative to the vertical axial plane of the sprocket wheel 12 and the angular form of the arm 7 in conjunction with the provision of a central opening in said arm to accommodate the bearing 15 are important factors in securing this result.

Figure 5 shows the relation of the arm 7 to the sprocket wheel 11 when the feeder A is substantially in its left hand limiting position, it being evident from this view that the shaft 14 of said sprocket may have any length necessary for engagement with a suitable driving means without said shaft interfering with the travel of the arm 7.

It is to be understood that when the feeder A is in its left hand limiting position the projection 5 engages an ice block or other object which is advanced upon the subsequent stroke of the feeder a distance equal to said stroke. Upon the return movement of the feeder the projection 6 swings down to clear the block thus advanced, a spring 26 acting to again lift said projection when the same has been carried to the left clear of said block. Upon the next stroke of the feeder to the right the projection 5 advances another ice block (or other object) and the projection 6 effects a still further advance of the previously shifted block. It is to be noted that the member A remains stationary for an instant at each end of its stroke while the elements D are being shifted downwardly or upwardly by the chain B from the shoulders 23 to the shoulders 24 or vice versa. This avoids the sudden shock which would be imparted to the reciprocatory member if its travel were immediately reversed as said member reaches its limiting position.

While the described mechanism has an especial application to use in preparing artificial ice for distribution it is evident that such a mechanism may be employed for any desired purpose.

The springs 19, not only maintain the chain B properly tensioned but also protect the chain from excessive stresses resulting from the inertia of a block of ice (or other object) when first encountered by one of the upstanding projections 5 and 6. Yielding of said springs permits of a momentary unyielding resistance of the ice block and the force stored in the springs as they yield, acts immediately to supplement the driving force of the chain in setting the ice block in motion.

What I claim as my invention is:—

1. The combination with a reciprocatory feeder, of an endless flexible member having oppositely travelling portions elongated in substantial parallelism to the direction of reciprocation of said feeder, drive elements carried by said flexible member upon opposite sides thereof, and a projection attached at one end to said feeder and extending across both of said oppositely traveling portions and having paired shoulders at opposite sides of each of said portions engageable by said drive elements to alternately actuate the feeder forward and back.

2. The combination with a reciprocatory feeder, of an endless flexible member having oppositely travelling portions elongated in substantial parallelism to the direction of reciprocation of said feeder, of a projection upon the feeder extending across both of said oppositely traveling portions and apertured to embrace both of said portions and alternately engageable by said portions to actuate the feeder forward and back.

3. The combination with a reciprocatory feeder, of an endless flexible member having oppositely travelling portions elongated in substantial parallelism to the direction of reciprocation of said feeder and co-extensive with a portion of said feeder, a feed element carried by said flexible member, and a projection from said portion of the feeder apertured to embrace both of said oppositely travelling portions and formed with shoulders alternately engageable by said drive element to actuate the feeder forward and back according as said element is moving with one or the other of said portions.

4. The combination with a reciprocatory feeder, of an endless flexible member having oppositely travelling portions elongated in substantial parallelism to the direction of reciprocation of said feeder, of a pair of drive elements carried by said flexible member upon opposite sides thereof, and a projection upon said feeder substantially transverse to its stroke and divided to extend across both of said oppositely traveling portions at each side thereof providing a pair of shoulders engageable by said drive elements to actuate the feeder in one direction and formed with a second pair of shoulders oppositely engageable by said drive elements to effect return movement of the feeder.

5. The combination with a reciprocatory feeder, of an endless flexible member having oppositely travelling portions elongated in substantial parallelism to the direction of reciprocation of said feeder, a drive element carried by said flexible member, rotatable supports for the flexible member, and a projection upon said feeder extending transversely to said oppositely traveling portions across both thereof and formed with an opening receiving one of said rotatable supports in a limiting position of the feeder and providing two pairs of shoulders alternately engageable by said drive element to actuate the feeder forward and back, the shoulders of each pair being spaced to afford travel between the same of the flexible member.

6. The combination with a reciprocatory feeder, of an endless flexible member having oppositely travelling portions elongated in substantial parallelism to the direction of reciprocation of said feeder, a drive element carried by said flexible member, and a projection upon said feeder attached at one end to said feeder and extending across both of said oppositely traveling portions and having its free end portion extending substantially parallel to the direction of reciprocation of the feeder, said projection having shoulders respectively adjacent the feeder and upon its free end alternately engageable by said drive element to actuate the feeder forward and back.

7. The combination with a reciprocatory feeder, of an endless drive chain for said feeder, having substantially parallel spans, sprocket wheels mounting said drive chain spaced in the direction of reciprocation of the feeder, drive elements upon said chain in opposed relation, and an arm upon said feeder having shoulders respectively engageable by said drive elements to actuate the feeder in opposite directions, and bearings for said sprocket wheels, said arm extending across both of said spans and being apertured to embrace one set of said bearings in a limiting position, adapting said arm to travel beyond the axis of said set of bearings.

8. The combination with a reciprocatory feeder, and an endless drive chain therefor, of drive elements mounted upon said chain at opposite sides thereof, and a drive arm carried by said feeder embracing both spans of said chain and formed with shoulders alternately engageable by said drive elements according as the same are travelling on one or the other of said spans, sprocket wheels mounting said chain, and supports for said sprocket wheels, one of said supports being yieldable toward the other, and said arm being apertured to embrace said sprocket wheel in a limiting position.

9. The combination with a reciprocatory feeder, of an endless chain for driving said feeder, sprocket wheels mounting said chain spaced apart in the direction of reciprocation of the feeder, drive elements carried by said chain upon opposite sides thereof, a feed arm carried by the feeder extending across both spans of said chain and apertured to form two pairs of shoulders respectively at opposite sides of said spans, said shoulders being spaced apart in the direction of reciprocation of the feeder, and bearings for said sprocket wheels, one of which projects in the direction of travel of the feeder and is engageable in the aperture of said arm in a substantially limiting position of the arm, adapting the latter to be actuated beyond the axis of the corresponding sprocket wheel.

10. The combination with a reciprocatory feeder, of an endless flexible member having oppositely travelling portions elongated in substantial parallelism to the direction of reciprocation of said feeder, drive elements carried by said flexible member upon opposite sides thereof, a pair of spaced rotative members mounting said flexible member, a drive shaft connected to one of said rotative members, and a projection upon said feeder extending substantially across both of said oppositely travelling portions, and having two pairs of shoulders, said pairs being alternately engageable by said drive elements according as the latter travel with one or the other of said oppositely travelling portions, one of said pairs of shoulders being so spaced in the direction of travel of the feeder from the mid-portion of said projection as to clear said drive elements through travel of said elements about the rotative member on said shaft without an encounter of the mid-portion of said projection with said shaft.

11. The combination with a reciprocatory feeder, of an endless chain for actuating said feeder, sprocket wheels for mounting said chain, one of which is movable to and from the other, a pair of fixed rods disposed upon opposite sides of the feeder, and a bearing member associated with the feeder having an intermediate portion constituting a bearing for said movable sprocket and having laterally spaced bearing portions slidably engaging said rods.

12. The combination with a reciprocatory feeder, of an endless chain for actuating said feeder, sprocket wheels for mounting said chain, one of which is movable to and from the other, a pair of fixed rods disposed upon opposite sides and extending longitudinally of the feeder, a bearing member for said movable sprocket member having diametrically opposed projections terminating in bearing portions slidably mounted on said rods, and yieldable members engageable with said bearing portions normally urging the bearing member in a direction to tension the chain.

In testimony whereof I affix my signature.

ALBERT W. HAPPEL.